United States Patent
Steg et al.

(10) Patent No.: US 7,284,234 B2
(45) Date of Patent: Oct. 16, 2007

(54) SYSTEM AND METHOD FOR IMPLEMENTING MAINTENANCE FUNCTIONS FOR A SWITCH

(75) Inventors: Sean C Steg, Stittsville (CA); George A Carroll, Kinburn (CA); David Yue, Ottawa (CA); Tracee Smith, Stittsville (CA)

(73) Assignee: Alcatel Canada Inc., Kanata, ON (CA)

( * ) Notice: Subject to any disclaimer, the term of this patent is extended or adjusted under 35 U.S.C. 154(b) by 659 days.

(21) Appl. No.: 10/288,307

(22) Filed: Nov. 6, 2002

(65) Prior Publication Data

US 2004/0085359 A1 May 6, 2004

(51) Int. Cl.
G06F 9/44 (2006.01)

(52) U.S. Cl. .................... 717/113; 717/106; 717/171; 717/120

(58) Field of Classification Search ............ 717/168, 717/171–173, 113–115, 120–121
See application file for complete search history.

(56) References Cited

U.S. PATENT DOCUMENTS

| | | | | |
|---|---|---|---|---|
| 5,410,703 A * | 4/1995 | Nilsson et al. | ............ | 717/168 |
| 5,555,416 A * | 9/1996 | Owens et al. | ............ | 717/178 |
| 5,819,042 A * | 10/1998 | Hansen | ............ | 709/222 |
| 5,835,759 A * | 11/1998 | Moore et al. | ............ | 713/1 |
| 6,016,143 A * | 1/2000 | Heinzman | ............ | 715/837 |
| 6,026,438 A * | 2/2000 | Piazza et al. | ............ | 709/221 |
| 6,070,012 A * | 5/2000 | Eitner et al. | ............ | 717/168 |
| 6,173,438 B1 * | 1/2001 | Kodosky et al. | ............ | 717/109 |
| 6,269,330 B1 * | 7/2001 | Cidon et al. | ............ | 714/43 |
| 6,286,038 B1 * | 9/2001 | Reichmeyer et al. | ............ | 709/220 |
| 6,289,511 B1 * | 9/2001 | Hubinette | ............ | 717/173 |
| 6,311,149 B1 | 10/2001 | Ryan et al. | | |
| 6,349,306 B1 * | 2/2002 | Malik et al. | ............ | 707/103 R |
| 6,351,521 B1 | 2/2002 | DuRee et al. | | |
| 6,356,554 B1 | 3/2002 | Pickett et al. | | |
| 6,463,552 B1 * | 10/2002 | Jibbe | ............ | 714/33 |
| 6,671,271 B1 * | 12/2003 | Takemura et al. | ............ | 370/352 |
| 6,757,837 B1 * | 6/2004 | Platt et al. | ............ | 714/4 |
| 6,765,591 B2 * | 7/2004 | Poisson et al. | ............ | 715/735 |

(Continued)

OTHER PUBLICATIONS

J. Ousterhout "Tcl/Tk Engineering Manual" Sep. 1, 1994, Sun Microsystems, Inc.*

(Continued)

*Primary Examiner*—Meng-Al T. An
*Assistant Examiner*—Jason Mitchell
(74) *Attorney, Agent, or Firm*—Marks & Clerk; Richard J. Mitchell

(57) ABSTRACT

In the invention, a system and method providing maintenance functions for an electronic device is provided. The system and method utilize configurable software tools to provide executable routines for a maintenance function related to the electronic device. The system and method employ a scripting module for building a script from a selection of tools utilizing a graphical user interface and for initiating activation of tools in the selection from selectable triggering events via the graphical user interface. The system and method utilize a script display module for generating a graphical representation of a script illustrating the selection of tools, relationships relating to triggering events of tools within the selection and a flow of execution of the scripts in the selection.

17 Claims, 14 Drawing Sheets

U.S. PATENT DOCUMENTS

| | | | |
|---|---|---|---|
| 6,802,053 B1* | 10/2004 | Dye et al. | 717/113 |
| 6,826,581 B2* | 11/2004 | Moslander et al. | 707/203 |
| 2003/0037310 A1* | 2/2003 | Ge | 717/113 |
| 2003/0061600 A1* | 3/2003 | Bates et al. | 717/133 |
| 2003/0179703 A1* | 9/2003 | Levy et al. | 370/230 |
| 2005/0120135 A1* | 6/2005 | Molnar et al. | 709/242 |

OTHER PUBLICATIONS

Bitter et al. "LabVIEW Advanced Programming Techinques", 2001, CRC Press, Ch. 1.*

* cited by examiner

Hardware Evaluation Module — 400

Switch Performance Evaluation Module — 402

Software System 210

Software Upgrade Module — 404

Network Monitoring Module — 406

Fig. 6D(ii)

Script - Build

| Select/Link | 626C ID | 626A Tool | 626B Tool Configure | Script Stop on Error | Condition | Connection |
|---|---|---|---|---|---|---|
| ☐ | 1 | LCR | LCR.ATool | ☐ | | Start |
| ☐ | 2 | connect | Connect.ATool | ☐ | OK | 1 |
| ↑ | ↑ | ↑ | ↑ | ↑ | ↑ | ↑ |
| Select/Link field | ID field | Tool field | Configure field | Stop Script on Error field | Condition field | Connection field |

Number of times to run script: 1

[Connect on OK] [Connect on Error] [Disconnect] [Add Tool] [Delete Tool]

[Draw Script] [Save] [Cancel]

ID: 1 → ID: 2

SYSTEM AND METHOD FOR IMPLEMENTING MAINTENANCE FUNCTIONS FOR A SWITCH

FIELD OF THE INVENTION

The invention relates to a system and method for implementing maintenance functions, such as component upgrades and software and firmware element upgrades, for a communication device, such as a switch.

BACKGROUND OF INVENTION

In a communication network, a communication switch receives, processes and forwards data traffic to and from other switches and communication devices. A communication switch is a complex system, comprising many modules embodied in separate hardware, software and firmware elements which act in concert to provide the functionality of the switch. The hardware elements comprise CPUs, volatile and non-volatile memory devices, specialized data processing and other devices. Volatile memory devices include RAM. Non-volatile memory devices include EEPROMs, EPROMs, FPGAs, PLDs and PGAs. Software elements typically provide a functional program executed by a CPU. They are frequently stored in stored non-volatile memory, but execute from volatile memory. Firmware elements are programs that are encoded into programmable non-volatile memory devices. In a large-scale switch, such as an ATM switch, there may be dozens of software and firmware elements that are installed on various hardware elements on the switch.

During the operational life of a switch, it will likely undergo one or more upgrades. For a given upgrade, software and firmware elements are almost invariably upgraded. To successfully complete an installation of a given upgrade, the revised software and firmware elements must be installed into their associated volatile and non-volatile memory devices via downloading the elements from a library source to the devices. As the number of software and firmware elements can be large for a switch, the task of upgrading these elements is non-trivial.

The process of installing updates of software and firmware elements for a switch is typically controlled at a terminal connected to the switch via commands manually entered by an operator through a Command Line Interface (CLI) on the terminal. Before upgrading a software element, it is good practice to evaluate the compatibility of the software element with any existing associated hardware element. Prior art systems have CLI comments to report on release levels of hardware elements. If the hardware element is not compatible, the software element may not function. If the hardware element is compatible, the upgraded software element may be downloaded to its appropriate storage location in the switch by again, by entering an appropriate command via the CLI.

This process must be repeated for each upgraded software and firmware element. While CLI commands may be grouped together in a batch command, prior art batch commands lack programmability and execution flow control. Also, prior art batch files cannot be used at different terminals for different hardware configurations of the switch.

Accordingly, there is a need for a system and method for upgrading firmware and software downloads for a switch that provides more flexibility and functionality than the prior art.

SUMMARY OF INVENTION

In a first aspect, a system for providing maintenance functions for an electronic device is provided. The system utilizes configurable software tools, with each tool providing an executable routine for a maintenance function related to the device. The system has a scripting module for building a script from a selection of tools utilizing a graphical user interface and for initiating activation of tools within the selection of tools from selectable triggering events via the graphical user interface.

The system may further have a script display module for generating a graphical representation of the script illustrating the selection of tools, relationships relating to the triggering events of those tools and a flow of execution of those.

The system may be used where the electronic device is a communication switch and the system operates on a computer associated with the switch.

The system may further have a script execution module providing a graphical representation of a script session. The session may comprise the script and another script operating on the electronic device. The execution module may also provide a graphical representation of the status of operation of the script and the another script.

The system may have the script execution module providing selectable activation and termination of the script and the another script via another graphical user interface.

The system may have each tool associated with a first file providing programmable parameters of operation and a second file providing limits on the parameters. Further, the scripting module may utilize the first and the second file to list scripting options to a user of the system.

In the system, one function may be an upgrade function for a software element. Therein, the script utilizes tools to evaluate hardware requirements of the communication device for the software element, download the software element to an appropriate storage location, activate operation of the software element and evaluate performance of the software element.

The system may have each tool operating in a UNIX environment on the computer.

In a second aspect, a method for providing maintenance functions for an electronic device is provided. The method utilizes configurable software tools to provide executable routines for a maintenance function related to the device, utilizes a graphic-based scripting module operating on a computer associated with the device to build a script from a selection of tools and to initiate activation of tools of the selection from selectable triggering events.

The method may further utilize a graphic-based script display module operating on the computer to generate a graphical representation of the script illustrating the selection, relationships relating to the triggering events of the tools within the selection and a flow of execution of the tools in the selection.

The method may further utilize a script execution module operating on the computer to generate a graphical representation of a script session comprising the script and another script operating on the electronic device. The graphical representation may further indicate a status of operation of the script and the another script.

The method may have each tool accessing a first file providing a set of programmable parameters of operation and a second file providing limits on the set of programmable parameters of operation. Further, the scripting module may utilizes the first file and the second file to list scripting options to a user of the system.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 6D(ii) is a representative diagram of a partially completed GUI window generated by the software system of FIG. 4 of the script build command of FIG. 6D(i);

DETAILED DESCRIPTION OF THE EMBODIMENTS

Figure 1:
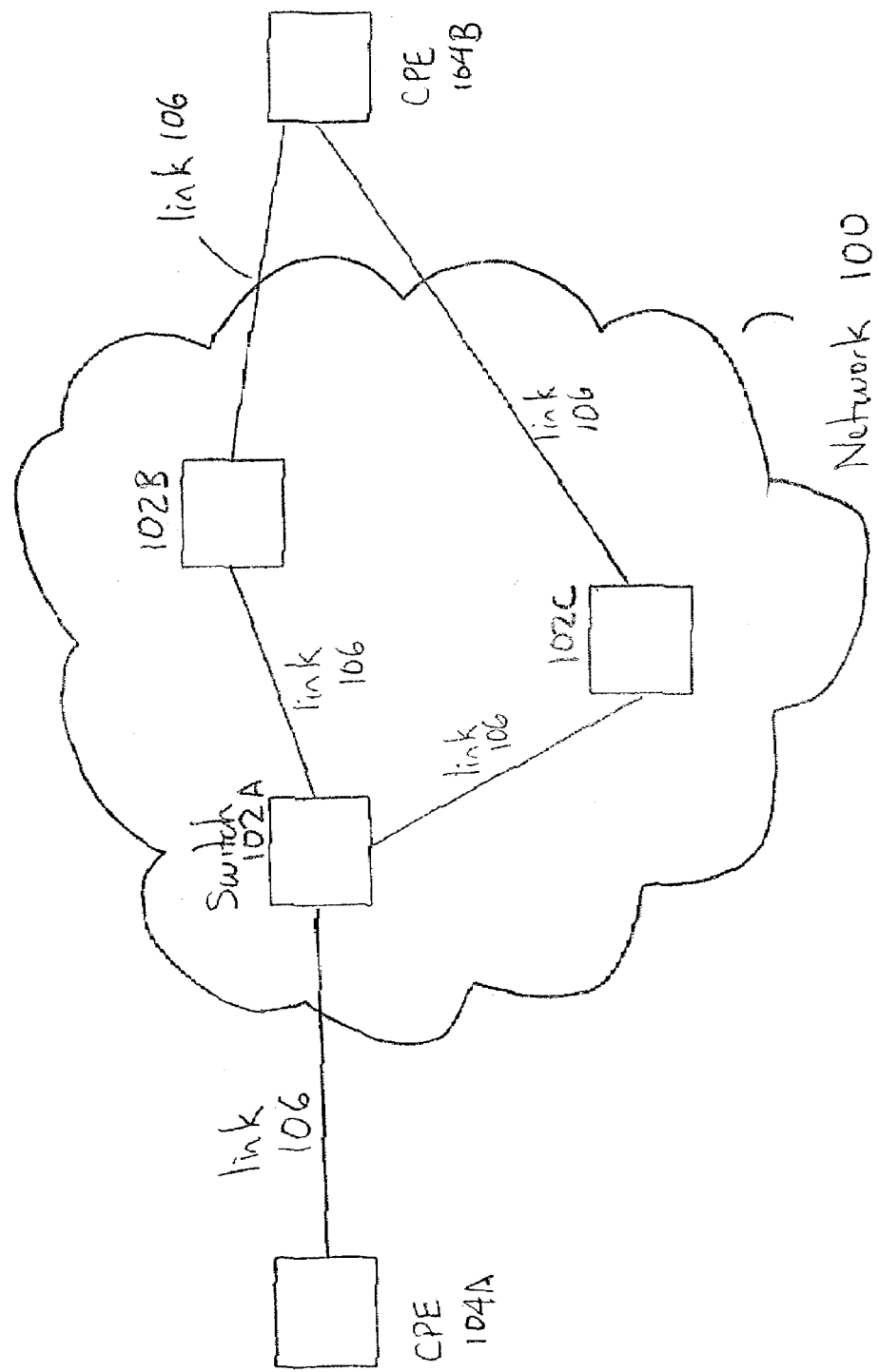
FIG. 1 is a block diagram of a communication network comprising a switch upon which an embodiment of the invention operates.

The description that follows, and the embodiments described therein, are provided by way of illustration of an example, or examples, of particular embodiments of the principles of the present invention. These examples are provided for the purposes of explanation, and not limitation, of those principles and of the invention. In the description that follows, like parts are marked throughout the specification and the drawings with the same respective reference numerals.

Background Elements

Referring to FIG. 1, communication network 100 is shown. Communication network 100 comprises a series of switches 102. Each switch 102 is connected with another switch via a communication link 104. Switches 102 and links 104 are enabled to carry data traffic to locations inside communication network 100 and to elements connected to communication network 100. In carrying data traffic, switches 102 utilize any one of a number of communication protocols, including, ATM, frame relay, IP and other protocols, to encrypt and transmit the data traffic. Communication network 100 also provides connections to external devices, such as customer premises equipment (CPE) 106A and CPE 106B. Accordingly, CPE 106A can transmit data traffic to CPE 106B through communication network 100.

Figure 2:
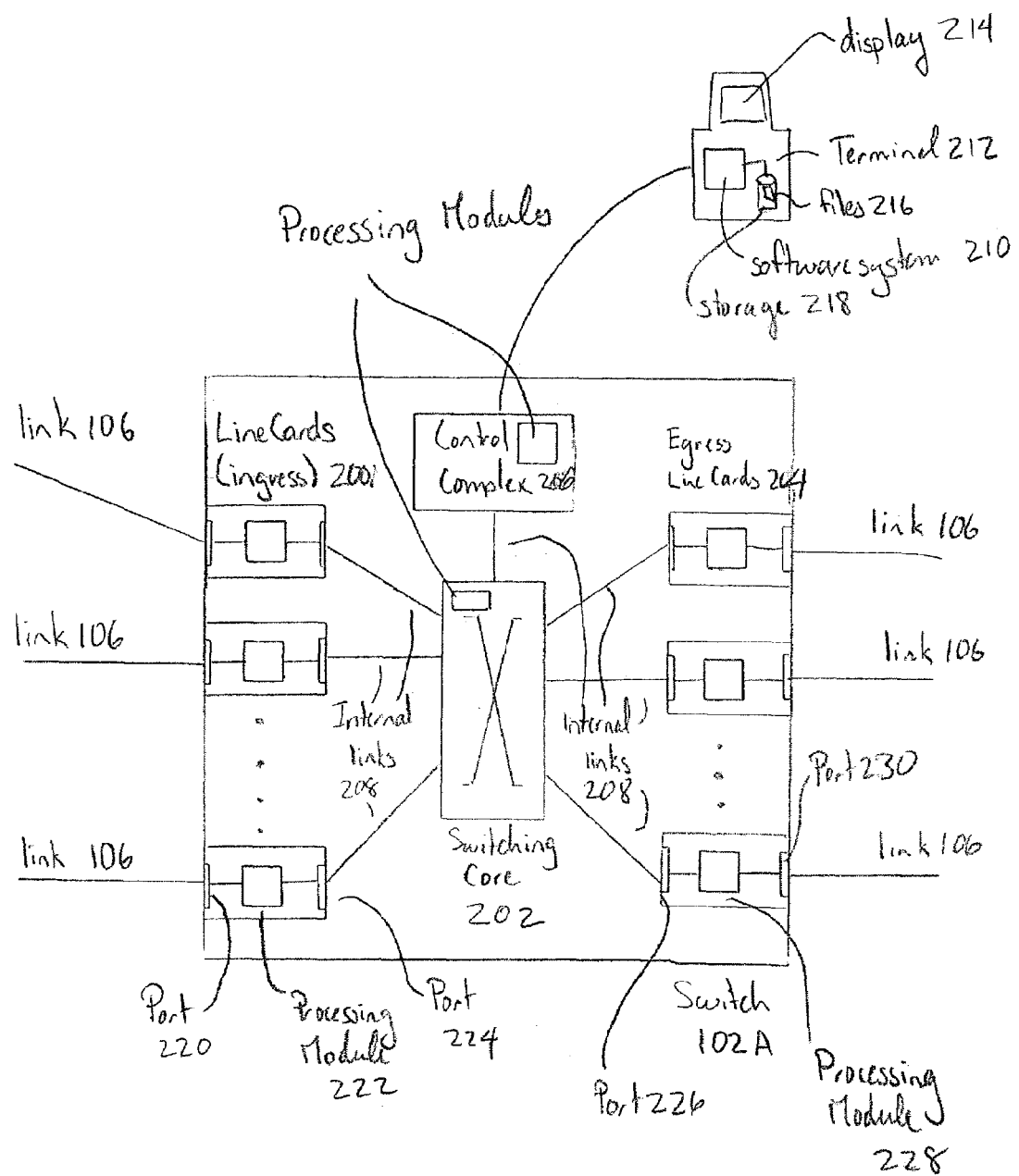
FIG. 2 is a block diagram of elements of the switch of FIG. 1, including line cards, switching core, control complex and a terminal upon which an embodiment operates.

Referring to FIG. 2, further detail of a switch 102 is shown. Generally, switch 102 comprises sets of the following operating modules: ingress line cards 200, switching core 202, egress line cards 204 and control complex 206. Line cards 200 receive and transmit data traffic from the switch 102 to an external device. Switch core 202 provides a connection matrix for the data traffic from any ingress card 200 to any egress card 204. These components are understood to be present in line cards 200 and are not shown. Control complex 206 provides control systems for the overall operation of switch 102. At an operating system level, control complex 206 can execute low-level routines which access individual modules and elements of the modules in switch 102. The low-level routines can query operating parameters of the modules and elements. Higher-level routines (described later) access the low-level routines to execute necessary actions on hardware and software elements associated with the higher-level routines. Software and firmware operating on control complex 206 also generate and maintain data files containing statistics, status and configuration data on selected modules and elements in switch 102. Internal communication links 208 each provide communication connections for the line cards 200 to the core 202, the core 202 to the egress line cards 204 and the control complex 206 to all modules. Each external link 104 connects a line card (200 or 204) to a particular external device, such as a CPE 106 or another switch 102. A switch 102 may be populated with different types of line cards 200 each having different data communication capabilities for different CPEs 106. Such capabilities include processing for OCN, IP and MPLS data traffic.

Figure 3:
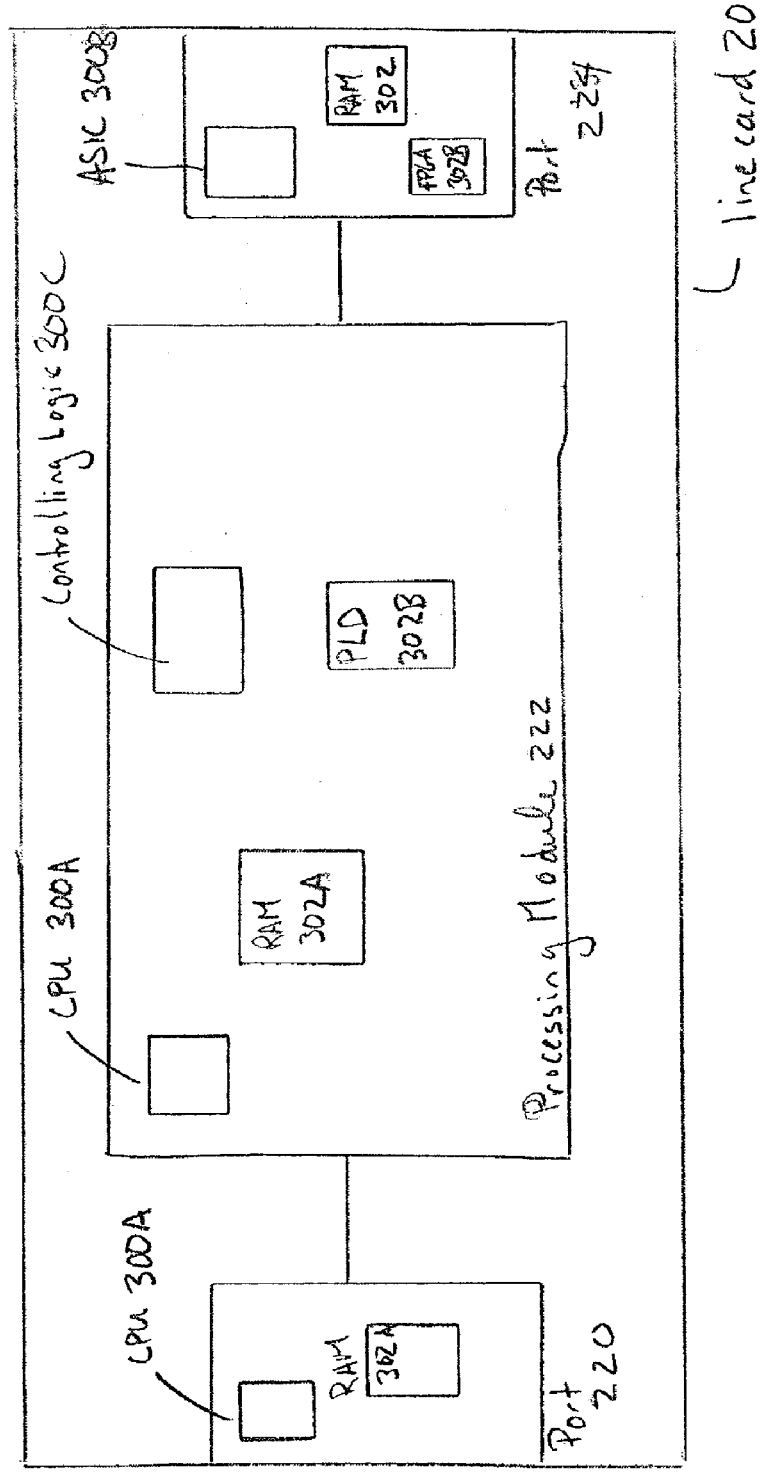
FIG. 3 is a block diagram of hardware elements of a line card of the switch of FIG. 2.

Referring to FIG. 3, further detail is provided on modules of line card 200. Processing module 222 utilizes a series of hardware elements 300 to provide the bulk of its functionality. CPU 300A is an exemplary hardware element; other hardware elements include ASIC 300B and controlling logic 300C. As noted earlier, for a CPU, such as CPU 300A, a software element is associated with CPU 300A enabling CPU 300A to control functional aspects of line card 200. The software element is stored in volatile memory element 302A. In the embodiment, memory devices 302A is RAM. Additionally, firmware elements may be stored in non-volatile memory devices 302B in processing module 222. In the embodiment, non-volatile memory devices 302B may be a FPGA, EPROM, EEPROM or a PLD. Non-volatile memory devices 302B may be associated with processing modules 222. Other hardware elements 300 and memory devices 302 may be located in ports 220 and 224, respectively. Logically, RAM 302A is preferably partitioned into an active and an inactive bank. CPU 300A accesses the current "active" memory bank for its software element. Using inactive and active banks, a version of a software element can be executed from the active bank in the memory element. Meanwhile, an upgraded software element can be downloaded into the inactive bank, while the software element is still operating on CPU 300A. If appropriate software element download integrity tests are passed, the upgraded software element is activated by switching the status of the respective banks, namely making the current active bank inactive and the current inactive bank active.

Elements of Software System

The operation of switch 102 is configured and controlled by software system 210 operating on terminal 212. Terminal 212 has display 214 allowing an operator to receive visual information about the operational status of switch 102, as monitored and generated by software system 210. Software system 210 operates via instructions executed on the CPU (not shown) of terminal 212. Data files 216 that are required by software system 210 may be stored in local storage 218 on terminal 212. Local storage 218 may comprise secondary level storage, such as a disk drive.

Figure 4:
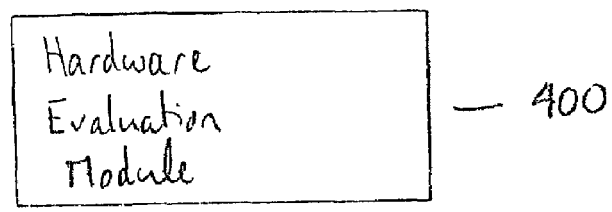
FIG. 4 is a block diagram of modules of a software system embodying the invention which operates on the switch of FIG. 2.
Figure 4:
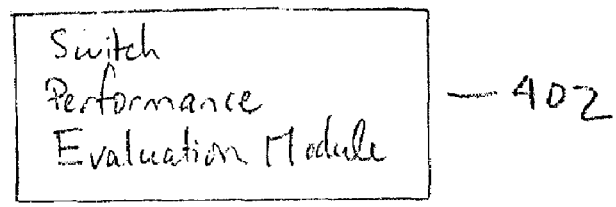
Figure 4:
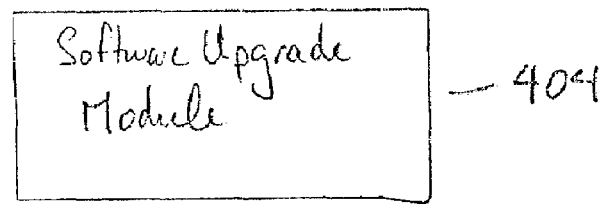
Figure 4:
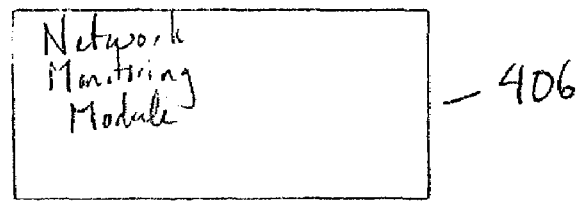

Referring to FIG. 4, software system 210 provides software routines which provide an operator with a family of tools which, collectively, allow an operator to check the configuration, check the status, upgrade, and execute statistics on various elements in the switch. Each tool, or software module, is a piece of software which can query low-level status and configuration information relating to the operation, connectivity and status of aspects of switch 102 using low-level routine calls which are known in the art. Further detail on the general operation of tools is provided below.

Software system 210 has a series of modules are linked together to provide an upgrade framework for targeted software elements of switch 102. The framework executes the following steps: (i) preparing the switch for the software/firmware upgrade; (ii) evaluating the data traffic characteristics of the switch and status of elements contained within the switch; (iii) executing the upgrade; (iv) evaluating the data traffic characteristics and switch status again after the upgrade; and (v) comparing the pre- and post-traffic and status characteristics of the switch. The framework presented by software system 210 provides a consistent interface for the operator to initiate and evaluate software and firmware upgrades for a switch. The modules include hardware evaluation module 400, switch performance evaluation module 402, software upgrade module 404 and monitoring module 406.

The hardware evaluation module 400 comprises a set of tools which collectively identify the type of hardware and the version of the hardware installed on switch 102. Such tools include a hardware compatibility determination tool, a node configuration tool and a node connections discovery tool. Switch performance evaluation module 402 comprises a set of tools which collectively conduct statistical analysis of the traffic throughput of components in switch 102. Software upgrade module comprises a set of tools which collectively download the of software and firmware elements to their respective volatile and non-volatile memory devices 302 in the targeted locations in switch 102. Some of the software upgrade tools include a statistics collection tool, a switch status reporting tool, a database backup took, a download tool, a switchbanks tool, a card reset tool, a line card reset (LCR) tool, a line card switch tool, a control switch tool and a fabric switch tool. Network monitoring module 406 comprises a set of tools which collectively monitor the status of several switches 102 in network 100. Some of the monitoring tools include a card status reporting tool, a connectivity status reporting tool, a report viewer tool, a report analyzing tool, a load verification tool, the statistics tool and a traffic monitoring tool.

In step (i), tools in hardware evaluation module 400 are used to determine whether switch 102 has the necessary hardware elements, at an acceptable version, to operate the software and firmware element updates. If the necessary hardware elements are present, a download tool from the software upgrade module 404 is activated to download the software and firmware elements to the inactive bank of the target storage elements 302. In step (ii), tools in switch performance evaluation module 402 gather statistics of events related to the throughput of data traffic for relevant components of switch 102, namely the line cards 200, core 202 and line cards 204. Also in step (ii) the status of internal switch connections, cards and ports are analyzed. In step (iii), tools in software upgrade module 404 activate the downloaded software and firmware elements by switching the status of the inactive storage banks of the memory devices to "active" to install the upgraded software and firmware elements into switch 102. In step (iv), tools in switch performance evaluation module 402 gather statistics of events measured in step (iii). Next, in step (v), statistics gathered in steps (ii) and (iv) are compared and a report is generated which identifies what performance changes have occurred since the upgrade. A network operator may then review the report and investigate potential performance issues caused by the upgrade. It will be appreciated that the modules and their arrangement in the framework may be customized and changed to operate on different switch configurations.

Figure 5:
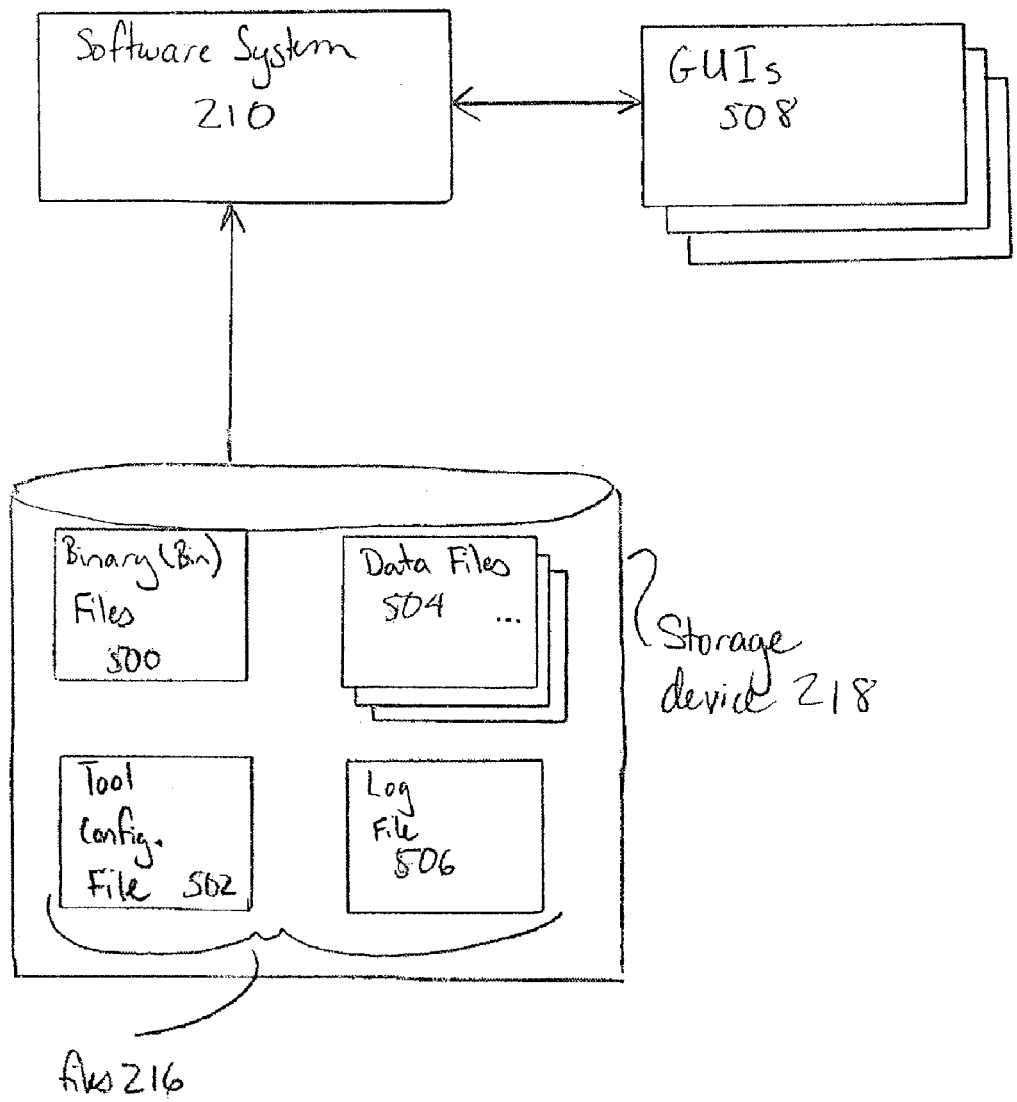
FIG. 5 is a block diagram of elements of the software system of FIG. 4 with related files and related graphical user interface (GUI) displays.

Referring to FIG. 5, software system 210 utilizes files 216 stored in terminal 212 in a mass data storage device, such as a hard disk. Files 216 include binary (bin) files 400, tool configuration files 402, data files 404 and log files 406. Bin files 400 provide the earlier noted higher-level routines which make appropriate calls to the lower-level routines to provide the functionality of commands used when downloading. In one embodiment, software system 210 and files 216 are encoded on a transportable media, preferably a CD-ROM. Accordingly, a single CD-ROM set can provide software system 210 and files 216 to different switches 102. In other embodiments, software system 210 and files 216 may be installed on a file server connected via a network to switches 102. In one such other embodiment, the file server may utilise ftp file download protocols.

Tools of Software System

A basic element of software system 210 is a tool. A tool is a bin file 400 which provides a series of executable commands, in software, which are processed by control elements in switch 102. Different tools provide different functions. A tool provides the equivalent functionality of a series of commands which are provided to a CLI of a prior art system. Commands contained within a bin file follow Tcl language and library constructs. As with a CLI command, a tool may operate on provided parameters. A tool may use a static parameter or a dynamic parameter. A static parameter does not change and may be provided as fixed data in an appropriate manner, such as an explicit value provided as a static parameter entered with the tool on the CLI. For a dynamic parameter, a tool accesses a target file stored in files 216, identified as files having an ".ATool" (for "answer" file) extension on its file name. Further, a tool may be associated with one or more target files and each target file may provide a unique set of parameters for a tool.

Often, for a set target files, a parameter is present in each member in the set and the value of the parameter remains fixed for each member of the set. To facilitate proper maintenance of the settings for the parameter, the embodiment provides a common generic file for storing the parameter identified with a ".generic" extension. Accordingly, when modification is made to the parameter, a single change can be made to the value in the common file, instead of making the same change to each target file.

Also, the software system 210 enables tools to be associated with specific destinations in the switch, using a label. A label identifies a set of destinations which are specifically associated with the tool. The contents of a label are stored in a file having a ".custom" extension. Accordingly, if a destination is not included in a label, it is excluded from the operation of the tool. This may be useful, for example, for a download tool if a download is intended to be executed on almost all OCN cards, except a particular card. An appropriate label can be generated, then used by the download tool to not download to a particular card.

Software system 210 can also be programmed to create and populate a report file which contains status information on the destination and statistics related to a tool. Also, each tool may generate an operational log which may be configured by the operator to log in selected levels of detail. Each execution of a tool generates a log file in data store 506 such that existing logs are not overwritten by software system 210.

Further detail on aspects of the files and their constructs are provided below. The tools of software system 210 are grouped, for convenience only, into the following categories:

| Tool Family | Tools |
| --- | --- |
| Audit Tools | Hardware compatibility |
| Diagnostic Tools | Statistics; Traffic Monitor |
| Initialization Tools | NodeConfiguration; Discover Nodes |
| Profiling Tools | Get Connection Status; Report Analyzer; Statistics Collector; Status Collector |
| Switch Tools | Control Switch; Fabric Switch; LCR Switch |
| Upgrade Tools | Download; Reset Card; Switch Banks |

The NodeConfiguration tool executes low-level routines that access control complex 206 to obtain information hardware elements in switch 102. The information is written to a file 216 with a ".node" extension. The DiscoverNodes tool executes low-level routines that access control complex 206 to identify notes in network 100 connected to switch 102.

Hardware compatibility tool executes low-level routines that identify a version of a targeted hardware element. In an embodiment, the data identifying a version of a hardware element is by control complex 206 and stored then provides a report on the operational requirements on the hardware element in view of the targeted software or firmware element upgrade.

ConnectionStatus tool executes low-level routines that access data files maintained by control complex 206 to determine the status of immediate nodes connected to switch 102. StatusCollector tool executes routines that generate a report of operating status of selected line card, I/O card and a port. StatisticCollector tool is able to collect statistics relating to ports or endpoints associated with switch 102. For a port, StatisticsCollector tool can collect a report on the number of valid cells processed, cells discarded and cells transmitted. For an endpoint, it can collect a report on the number of valid cells received, cells discarded and cells transmitted. The tool can be operated on a single port/endpoint of switch 102 or multiple ports/endpoints. StatisticsCollector tool executes SNMP protocols to collect statistics of switch 102. As SNMP protocols are used, switch 102 must have IP connectivity. PathStatus tool execute routines which access datafiles generated by switch 102 to identify and summarize the paths configured for switch 102.

Statistics tool accesses statistic datafiles generated by switch 102 to monitor traffic patterns. The TrafficMonitor tool is a script-enabled version of the Statistics tool allowing data traffic anomalies to can be detected during the execution of a script.

The ControlSwitch tool enables switching of control modules in switch 102 from the active module to the inactive module. The Fabric tool and LCR tool provide similar switching between active and inactive modules akin to the ControlSwitch tool except they operate on either a redundant fabric or a redundant line card.

The Download tool downloads an identified software or firmware element to a selected module in switch 102. It can initiate downloads to multiple cards simultaneously. The SwitchBanks tool switches flash bank to boot from on cards within the node to the desired version of software for each card. The ResetCard tool resets non-redundant line cards.

Further details on the design and implementation of a tool and related files are now provided. The ToolBin is a binary file that executes for each instantiation of a tool. In the embodiment, it is spawned as separate process. In a UNIX environment, a wish process is spawned. The process, in turn, calls the associated tool. Upon activation, a ToolBin executes a Tcl procedure that initializes the communications path to the GUI process, parses command line options of the tool, fills a local structure in RAM with these options and indicates a log for the tool. Then the tool is executed. Typically, the tool is a Tcl procedure having one argument. After the tool executes, the ToolBin terminates all tool spawned processes and reports the status of execution of the tool (success or failure) to the parent that initiated the tool.

When a tool is started, software system 210 spawns a wish shell and passes it necessary parameters. From a wish shell, an exemplary execution line may appear as % exec wishx ToolBin -d display -at ToolName -aa ATool -ac FALSE -av TRUE -al LogName -as ScriptName -ao OptionFile, where the options are as follows:

-d identifies of the Unix machine where the operator is operating;

-at identifies the tool to execute;

-aa identifies the Atool file associated with the execution of the tool;

-ac identifies whether the tool was spawned from the command line or the main GUI;

-av specifies the level of event logging requested;

-al identifies the log file name associated with the tool;

-as identifies the script name, if the tool was initiated from a script;

-ao identifies the option file name.

Defaults for the options may also be provided in the command line.

Software system 210 also provides a framework developing new tools and modifying existing tools used by software system 210. Generally, an operator of software system 210 does not have access to the framework. As noted above, in a tool, a window in generated is which a series of questions are presented to the operator. Answers are provided by the operator via a selection from a sub-window list generated by the software system 210. For the answers, the system provides boundaries and controlled selections to the questions in the window. The boundaries and controlled selections provide control over the information retrieved in the window, thereby limiting the possibility of data boundary errors by inappropriate answers supplied by the operator. The framework for the questions is defined by the software system developer in a question tool file (QTool) that is in turn used by software system 210. A QTool file provides text information, data limitations, default values and mandatory value requirements for questions presented in the window. An ATool associated with the QTool provides some of the limits on the parameters of a tool. Table B illustrates an exemplary question file that may be generated by a developer:

TABLE B

{WINDOWID 1} {QUES "Please choose a Node file(s):"} {DEFAULT ""} {VAR sNodeName} {TYPE RADIO} {DATA "PV_DataDrive PV_GetNodeFileOrPath FILE"} {MANDATORY 1} {HELP "Click here to choose a node file."}
{WINDOWID 1} {QUES "Found a Node file(s) in:"} {DEFAULT "PV_DataDrive PV_GetNodeFileOrPath PATH"} {VAR ""} {TYPE LABEL} {DATA ""} {MANDATORY 0} {HELP ""}
{WINDOWID 2} {QUES "Node file(s) selected:"} {DEFAULT "@sNodeName"} {VAR sNodeName} {TYPE LABEL} {DATA ""} {MANDATORY 0} {HELP ""}
{WINDOWID 2} {QUES ""} {DEFAULT "NMTI CPSS"} {VAR sProtocols} {TYPE INTERNAL} {DATA ""} {MANDATORY 1} {HELP ""}

In the first "sentence" in Table B, the following command string is provided:

{WINDOWID 1} {QUES "Please choose a Node file(s):"} {DEFAULT ""} {VAR sNodeName} {TYPE RADIO} {DATA "PV_DataDrive PV_GetNodeFileOrPath FILE"} {MANDATORY 1} {HELP "Click here to choose a node file."}

In the first sentence, commands defined by the developer are encapsulated in { } brackets. The parameters for the commands in the bracket appear in capital letters. For example, the WINDOWID parameter identifies which window in a possible series of configuration windows will this question appear. The QUES parameter provides the text for the first question. The DEFAULT parameter provides the default value of an answer to the question. The VAR parameter identifies the name of the variable associated with the answer. The TYPE parameter identifies a type of window used to display possible answers to the first question. The DATA parameter identifies the source of the data for the answer. Table C provides a summary of question parameters controlled by the question tool file identified in Table B:

TABLE C

| Parameter | Description |
|---|---|
| WINDOWID | The WINDOWID parameter has a value representing the window identification for the question. Example {WINDOWID 1} |

TABLE C-continued

| Parameter | Description |
|---|---|
| QUES | The QUES parameter has the text of the question. Example {QUES "Please choose a colour."} |
| DEFAULT | The DEFAULT parameter indicates a default answer to the question. If the question requires that a default answer be displayed then the data is provided here. For example: {DEFAULT "Blue"} |
| VAR | The VAR parameter saves the operator's answers to variable name in the answer file. Example: {VAR sColor} |
| TYPE | The TYPE parameter defines the type of answers available to a question. The TYPE parameter has the following values: ENTRY, PASSWORD, LABEL, CHECK, EXTENDCHECK, RADIO and INTERNAL, representing types of answers to questions. An ENTRY type allows an operator to enter an answer via a keyboard. A PASSWORD type allows the operator to enter an answer via the keyboard, while the entered characters are masked with "*" characters in the window. A LABEL type provides only displayed information. The CHECK type provides the operator with a drop down list from which the operator selects |

TABLE C-continued

| Parameter | Description |
|---|---|
| | (by checking) one or more items from the list. An EXTENDCHECK type is similar to a CHECK type, but displays all selected items in a selection area. A RADIO type is similar to a CHECK type, but only one selection may be checked from the drop down list. An INTERNAL type does not display the information to the operator and the data will be transmitted directly to the tool upon execution. |
| DATA | The DATA parameter contains a list of acceptable answers to a question. Example: {DATA "Red Blue Orange Green"} |
| MANDATORY | The MANDATORY parameter indicates whether an answer must be provided to the question. A value of one means that an answer is mandatory and zero means that it is not. |
| HELP | The HELP parameter contains text providing further information about the question to the operator. The text of the HELP parameter is displayed as balloon |

TABLE C-continued

| Parameter | Description |
|---|---|
| | help when the operator places the cursor over the answer field of the question. Example {HELP "Select the colour that is your favourite."} |

Software system 210 provides a set of procedures which may be called by a Qtool. For example, procedure "PV_DataDrive" is shown in Table B. PV_DataDrive provides a Qtool with a function to allow the Qtool to obtain operating data which is not determined at compile time because the data is either variable or becauese it can only be determined at run time. Procedures are implemented in Tcl (Tool Command Language) and are identified with a "PV_" prefix.

Software system 210 stores tools in the "<<installbase>>/data/pv" directory. Accordingly, any new tools must be stored by the developer in that directory. Tools may also access procedures, which are canned sets of commands using the PV_DataDrive procedure. Names of the data files or QTool files relating to tools must be added to the central list of tools. The list is stored in the "<<installbase>>/feature/PV_Glbls.nash" file.

To illustrate execution of an exemplary tool, a brief description is provided of the execution of a download tool. As noted above, the download tool is called when an operator wishes to download a software element to its associated storage element. One of the functions of the download tool is to determine whether software element identified for downloading is already installed in the associated storage element. If the software element is already installed, then the download tool exits. If the download is to proceed, the download tool evaluates the selected parameters provided by the operator. Once the input parameters are parsed by the download tool, it begins execution via execution of an associated ToolBin command. For each card selected by the operator, the Download tool evaluates whether the software element should be installed in the card. As such time, the operator is prompted via a question in a GUI to determine whether or the download is to proceed. If the download is to proceed, the download tool begins to download the software element to each storage element for each card. The download tool can provide multiple downloads simultaneously. Finally, the download tool updates its log file to identify which cards are currently being updated, which cards have been updated and which cards have failed in their updating. For the download tool, the associated Qtool/Atool pair provide a template of questions presented to the user by the tool (in the Qtool file) and a corresponding set of answers from which the user may select one answer for the questions (in the Atool file). The answer selected by the user is used by the tool to initiate its action. Tools are defined globally within a PV_file structure enabling software system 210 to display through the GUI an appropriate set of tools (as defined in the Qtool file) for the function selected by the user. Once the user has selected a tool therefrom, the PV_file structure enables software system 210 to activate the appropriate function (as defined in the Atool file).

Scripting Module for Tools

While each of the tools of the embodiment is, functionally, an independent, executable command, software system 210 provides a scripting module to build a script comprising a series of tools, with each tool in the series having an execution relationship with other tools in the series. In providing the scripting module, software system 210 incorporates GUI systems and screens to facilitate use of the module. A description of aspects of the GUI system follows.

Figure 6A:
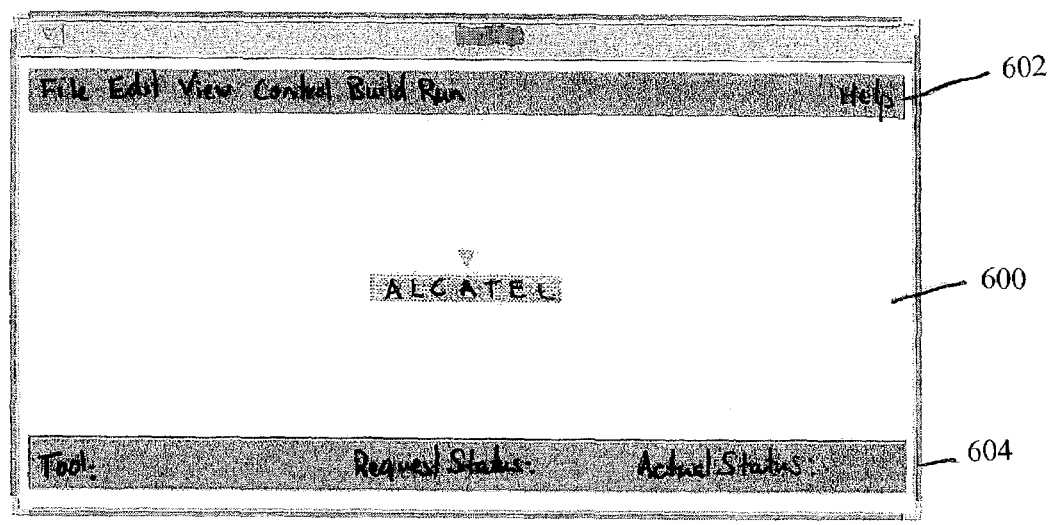
FIG. 6A is a representative diagram of a GUI window generated by the software system of FIG. 4 upon initiation of the software system.

Referring to FIG. 6A, upon initial activation of software system 210, screen image 600 is generated on the connected terminal by an appropriate bin file 500. Screen image 600 is an exemplary GUI window. At the top portion of screen image 600 is menu bar 602, which provides a series of functions which can be selectively activated by the operator. The functions include: "File", "Edit", "View", "Control", "Build", "Run" and "Help". As with known GUI. displays, an operator can activate one of the functions by using an input device such as a mouse (not shown) connected to terminal 212 to move a cursor on display 214 to highlight a command and then activate the command using a button on the mouse. Activation of a function causes software system 210 to spawn either a selection submenu or a new window, depending on the context of the activated function. At the bottom portion of screen image 600 is a status bar 604 which provides the operator with text status information of various aspects of the software system 210 and switch 102.

Figure 6B:
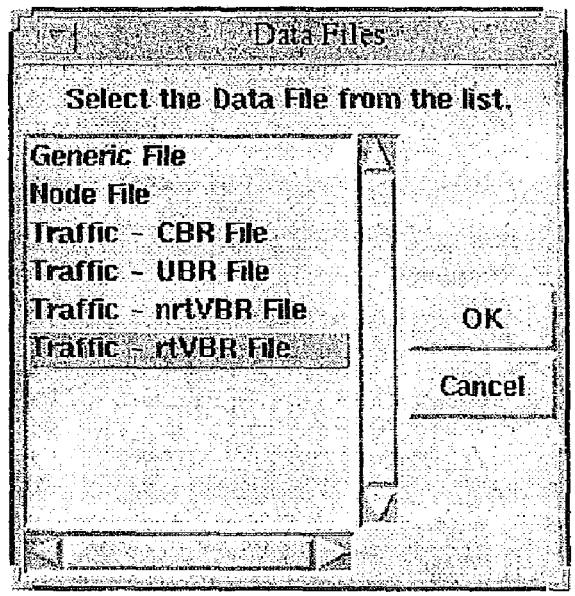
FIG. 6B is a representative diagram of a GUI window generated by the software system of FIG. 4 upon initiation of a data file command from the GUI window of FIG. 6A.
Figure 6C:
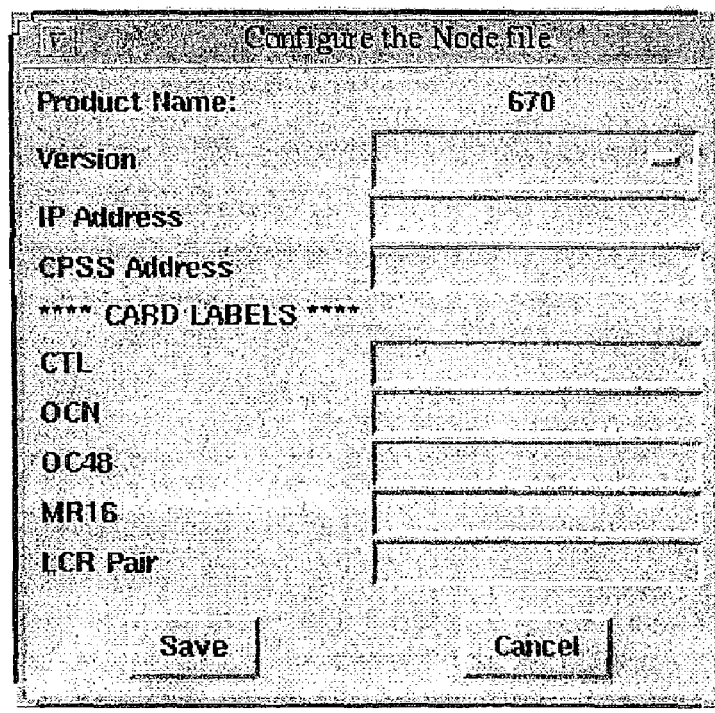
FIG. 6C is a representative diagram of a GUI window generated by the software system of FIG. 4 upon initiation of a node configuration command from the GUI window of FIG. 6A.

For example, referring to FIGS. 6B and 6C, two exemplary GUI windows are generated by software system 210 during its execution. Specifically, referring to FIG. 6B, data file window 650 is generated when the operator requires access to the list of accessible files associated with switch 102. The list of accessible files may include files which were created through the GUI interface of software system 210. Referring to FIG. 6C, window 660 is generated by software system 210 when the operator needs to update administrative data associated with a node in communication network 100. In particular window 660 displays an exemplary definition of a type of data file created using the FILE command, NEW subcommand selection available from the menu bar 602 command interface. The data file which is created may be used as an input for a tool as the user configures and/or executes the run the tool.

Figure 6D:
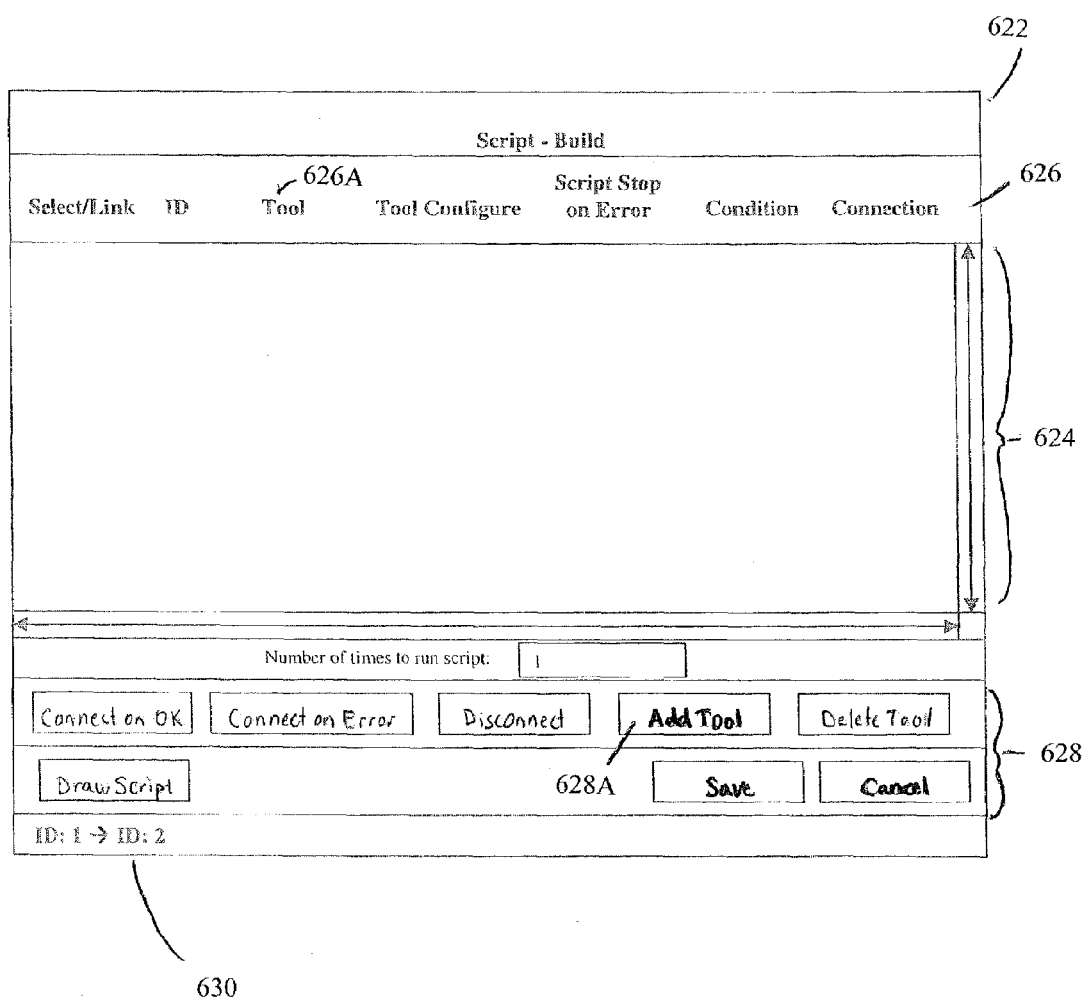
FIG. 6D(i) is a representative diagram of a GUI window generated by the software system of FIG. 4 upon initiation of a script build command from the GUI window of FIG. 6A.

Further, as an enhancement to the "Build" function, described earlier, software system 210 uses GUI systems to enhance the of the Build function. To build a script, the operator initiates the Build command of software system 210. Referring to FIG. 6D(i), once the Build command is activated software system 210 generates window 622 on terminal 212. Window 622 has tool area 624, were a series of tools can be each inserted as rows and each tool can be selectively linked to other tools in other rows. Entries in header row 626 identify specific attributes of the inserted tools. Radio buttons in region 628 provide shortcuts for executing editing commands for the script.

To add a tool in window 624, operator activates the "Add Tool" command button 628A and the software system 210 generates a pop-up sub-window of categories and available tools (not shown). After the operator selects a desired tool, e.g., a download tool, software system 210 populates window 624 with a tool icon in column 626A. If an answer file is to be associated with a tool, the operator activates the "Configure" button and configuration windows are generated. A configuration window may differ depending on the selected tool. The configuration file is stored as a data file 404 and a tag for the target file appears in column 626B of window 624. Alternatively, Atools may be associated with the tool in the script build window by defining the Atool as a parameter.

After two tools have been added to the script, software system 210 enables associations to be made between the tools. Tools may be associated with each other for sequential, parallel or event-triggered execution. Tools are associated on a one-to-one basis where a single association is made between a "parent" tool and an "offspring" tool. However, multiple one-to-one relationships may be made from a single parent to multiple offsprings.

To establish a relationship between two tools, software system 210 uses a GUI-based linking process to identify the parent and the offspring tools. When establishing the relationship, software system 210 first has the operator identifying the parent tool by activating the Select/Link box of the parent tool in column 626A. Next, the offspring tool is identified by activating the Select/Link box of the offspring tool in column 626A. As shown, the Select/Link box for the Download tool is activated first, followed by the Select/Link box for the unconfigured tool. Once the two tools have been related, the relationship is shown in status box 630, where it indicates "ID: 1→ID: 2". The relationship between the parent and the offspring tools is indicated in the "Condition" field 626B field of the offspring tool. In the example, the Condition field for the unconfigured tool is a "2", indicating that the Download tool is the parent tool, namely the tool with the ID field of "1".

After an association has been established between two tools, further aspects of the association are defined. An offspring tool may be activated under one of two conditions: either the successful execution of the parent tool or the failed execution of the parent tool. If the offspring tool is to be activated upon the former condition, after the relationship between the tools is set, as indicated above, the "Connect on OK" button 628B is activated. If the offspring tool is to be activated upon the latter condition, after the relationship between the tools is set, as indicated above, the "Connect on Error" button 628C is activated. The status of the activation condition for the offspring is indicated in the "Condition" field 626E, which displays either "OK" or "Error".

To add an additional tool to the script, the operator activates the "Add Tool" button in field 628 and selects from a pop-up window. The additional tool will appear in the next row in area 626. Then the operator creates an association between the Download tool and the additional tool, in a similar manner used to establish the association between the Download tool and the unconfigured tool.

The Build script also allows a script to be executed several times; this feature is programmed by entering an appropriate value in the "Number of times to run script" field 628D. Also. tools may be deleted and the build may be cancelled by activating the appropriate "Delete" or "Cancel" button. Aspects of a "built" script are shown in FIG. 6D(ii).

Figure 6E:
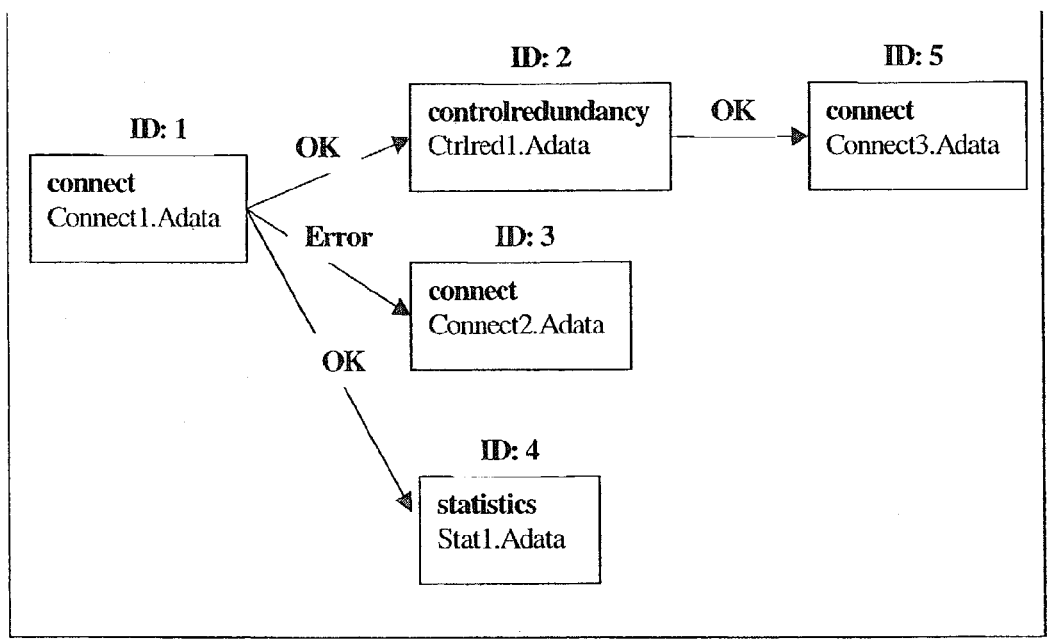
FIG. 6E is a representative diagram of a GUI window generated by the software system of FIG. 4 upon initiation of a script display command from the GUI window of FIG. 6D(i)
Figure 6F:
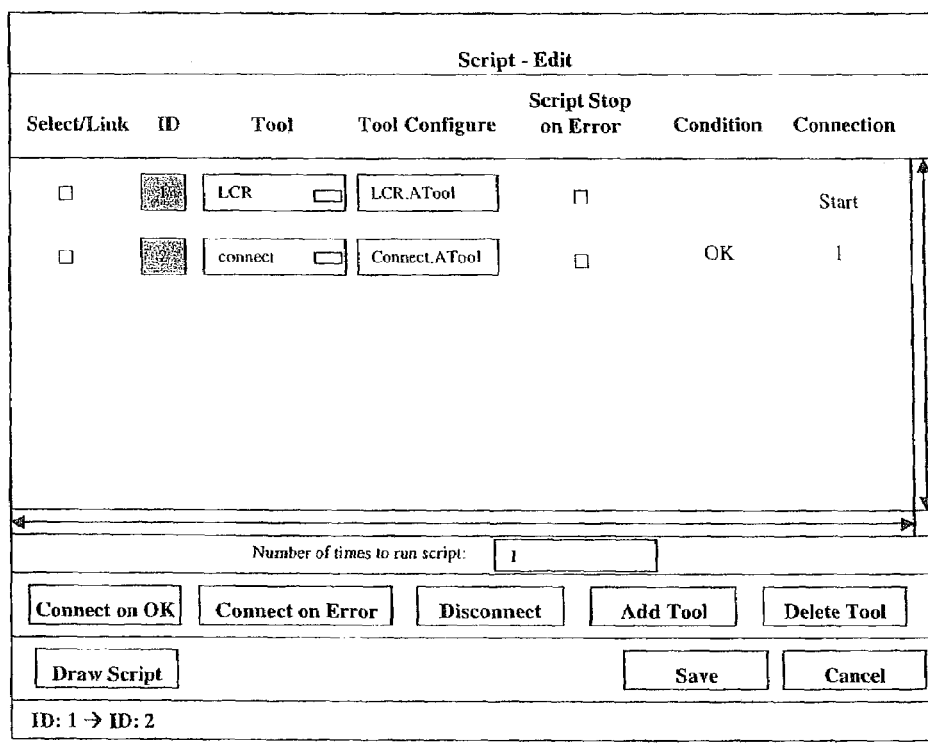
FIG. 6F is a representative diagram of a GUI window generated by the software system of FIG. 4 upon initiation of a script edit command from the GUI window of FIG. 6A.

Referring to FIG. 6F, software system 210 also generates a graphical chart of a script, showing relationships amongst the tools in the script. Image 600 illustrates a flow chart where Tool1 is executed first (ID=1), then, if no error is present, Tool2 is executed. Next, Tool3 is only run upon successful completion of Tool2. Next, Tool4 is executed if Tool2 fails. Finally, Tool 5 is executed only if Tool2 failed followed by a successful execution of Tool4.

After a script is built, it may be edited using the "Edit" command. When the Edit command is activated, the operator is provided a sub-window of available scripts for editing. After a script is selected, a window similar to FIG. 6E is generated by system software 210, which is similar to a Build window. At that point, an operator may reconfigure the script by reconfiguring the triggers for the displayed tools.

Figure 7:
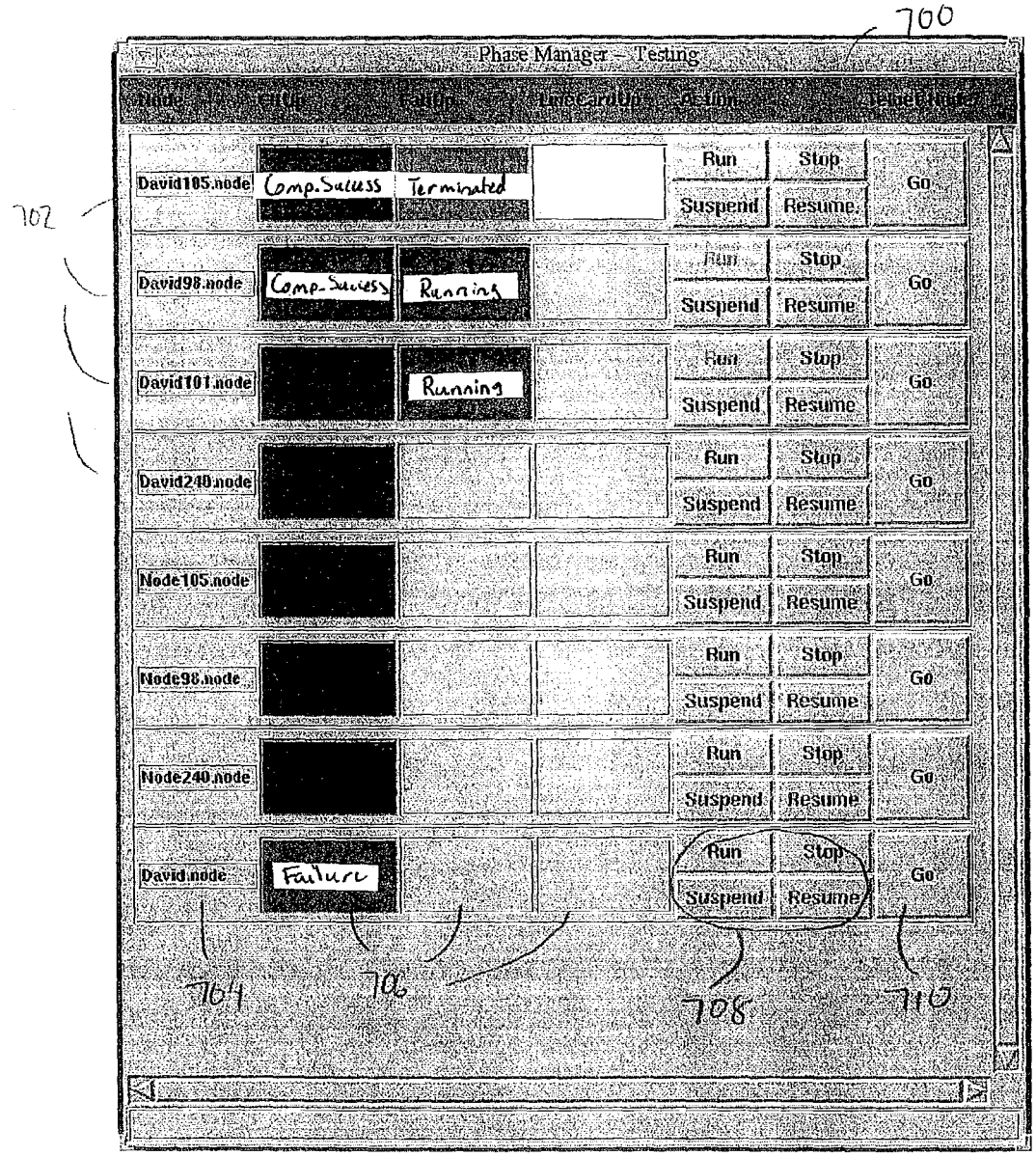
FIG. 7 is a representative diagram of a GUI window generated by the software system of FIG. 4 upon initiation of a phase manager command from the system shell.

Referring to FIG. 7, software system 210 provides a phase manager to execute and monitor the execution of scripts. The phase manager provides a method to execute identical scripts with the control over limited variables. Accordingly, it is possible to create one set of scripts and re-use the set on other nodes in the network by setting selected variables via the phase manager. Screen 700 illustrates a typical execution of the phase manager. Rows 702 indicate status of individual scripts being executed. Field 704 in each row 702 indicates the target associated with the script. Fields 706 indicate the status of each script on its target. Typical status include "Completed Successfully", "Failure", "Terminated" and "Halted." Radio buttons in group 708 enable the operator to selectively "run", "stop", "suspend" or "resume" the execution of the script on the target. Radio button 710 activates the selected radio button 708.

Exemplary GUI of Software System

Figure 8:
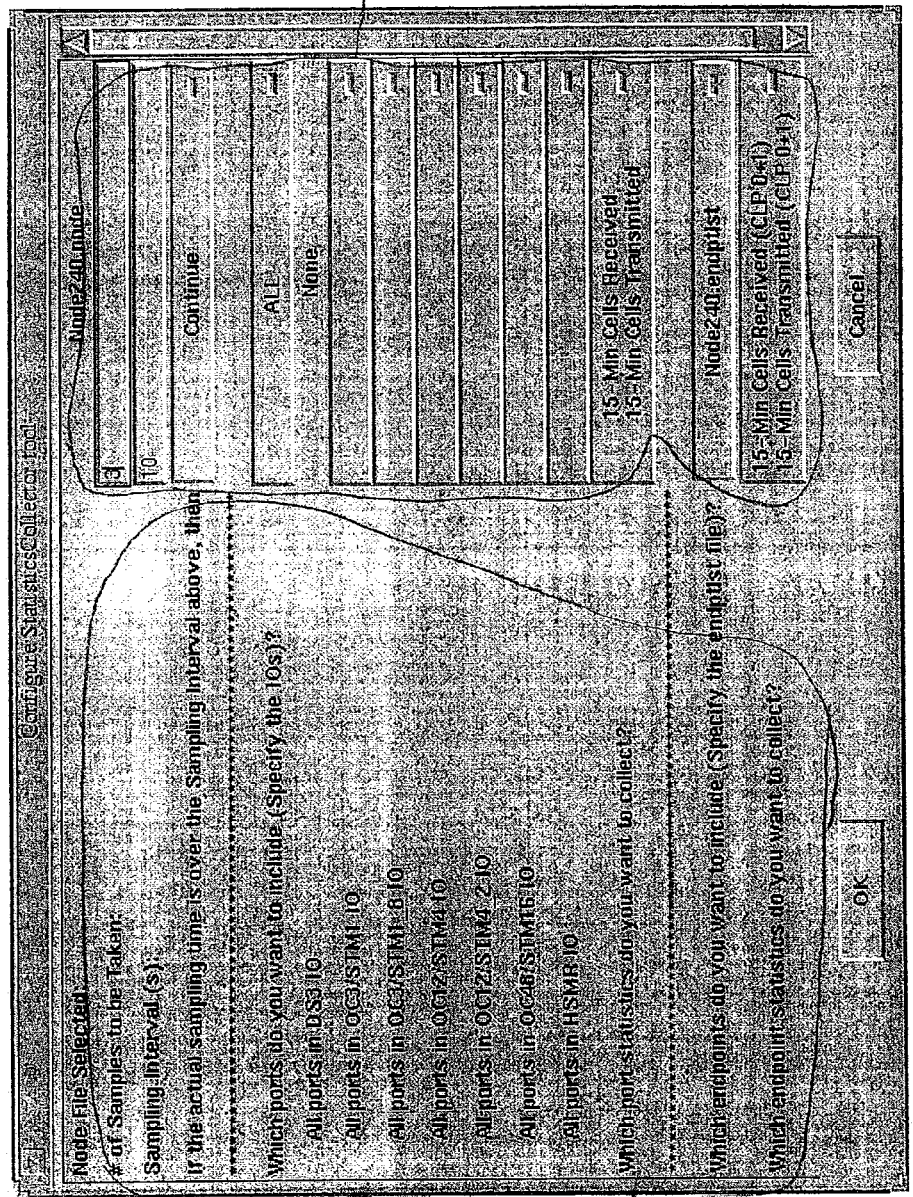
FIG. 8 is a representation of a StatisticsCollector GUI generated by the software system of FIG. 4 upon initiation of a StatisticsCollector tool.

As an example of the GUI of software system 210, further detail is provided for the interface of StatisticsCollector tool. Referring to FIG. 8, when the StatisticsCollector tool is initiated, first, the user is presented with a window showing a set of nodes associated with the tool. The parameters of the window are defined, in part, by contents of Qtool and Atool files associated with the StatisticsCollector tool. Once a node is selected by the user, window 800 is generated. Window 800 presents a series of programmable parameters for statistics relating to the selected node, shown collectively as parameters 802. For each parameter, a user may input a range or value for the parameter, shown collectively as values 804. Once the tool is activated by selecting the OK button in window 800, software system is configured to automatically start operation of the underlying tools associated with StatisticsCollector Tool.

Figure 9:
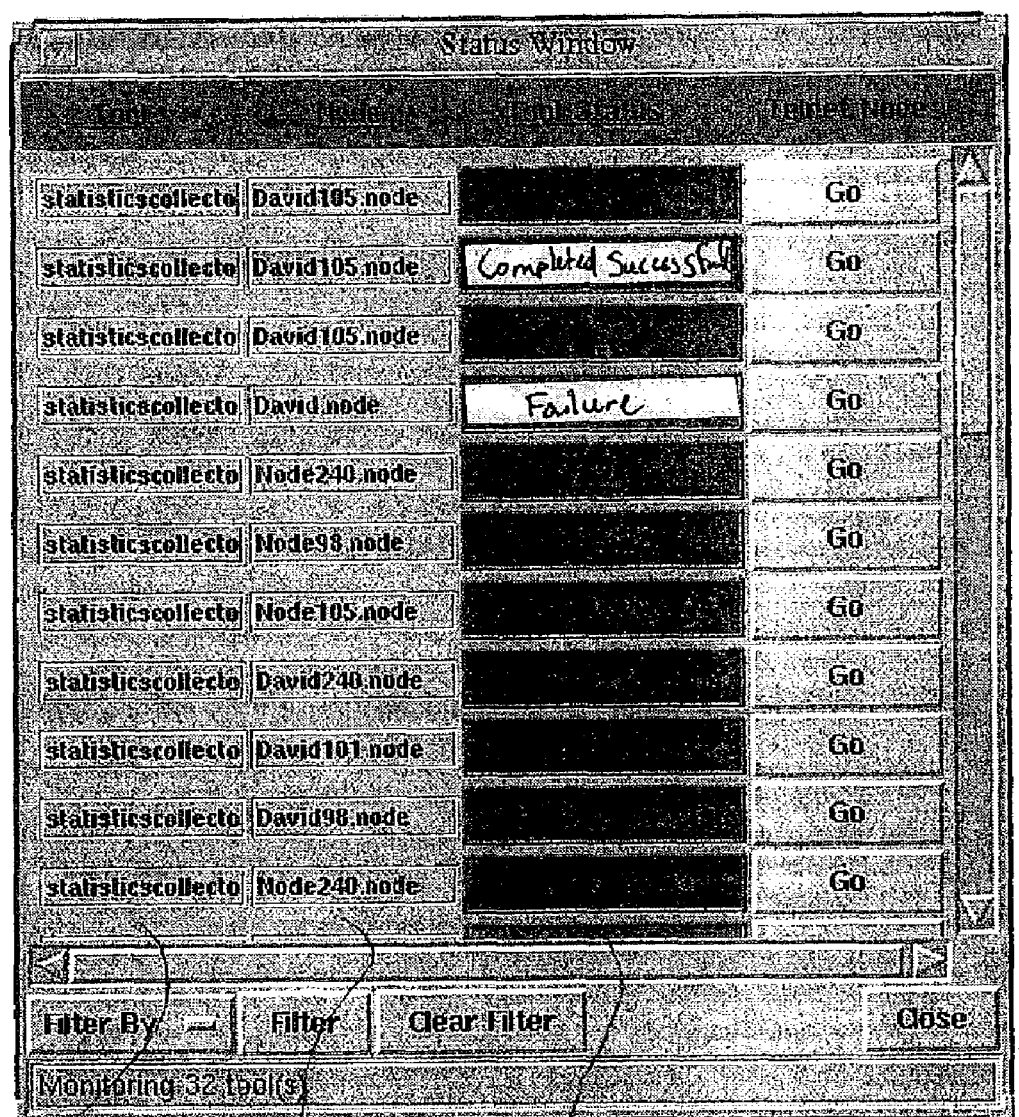
FIG. 9 is a representation of a Status Window GUI generated by the software system of FIG. 4 upon initialization of a View Status command from FIG. 6A.

Referring to FIG. 9, as a further example, when Status Tool is activated, window 900 is generated. Window 900 provides the operating status of tools which have been activated. The list of tools appears in column 902. For each tool, the associated node is shown in column 904. The status of each tool is shown in column 906. The status may be "completed successfully", "failure", "terminated" or additional required statuses. Status Tool has the flexibility to provide a GUI status report on the operation of a tool or a node.

In view of the above description it will be readily apparent that software system 210 provides a flexible, modular and expandable component maintenance system for a communication device, where components, such as software and firmware elements, are continually being upgraded. It will further be appreciated that the component maintenance system may be implemented on other electronic devices which have similar software, firmware and hardware upgrade needs to a communication switch.

It is noted that those skilled in the art will appreciate that various modifications of detail may be made to the present embodiment, all of which would come within the scope of the invention.

We claim:

1. A system for upgrading a node of a communications network with updated software, comprising:
   a computer terminal coupled to said node, said computer terminal including a display screen, a file storage system, and a software system, said software system comprising a plurality of linked modules to provide an upgrade framework for targeted software elements of the node, said linked modules comprising a hardware evaluation module, a performance evaluation module, a software upgrade module, and a network monitoring module, each said module including a set of configurable software tools stored as files in said file storage system and providing executable routines for performing functions associated with their respective modules;

a graphic-based scripting module on a said computer terminal configured to present an operator with a screen image to permit the operator to build a script from a selection of tools selected from said sets of software tools and to initiate activation of tools within said selection of tools from selectable triggering events;

said graphic-based scripting module presenting a respective graphical representation of each of said selection of tools on a screen image, and having input elements for receiving instructions from the operator for sequencing ones of said selection of tools for said script; and said graphic-based scripting module being configured to permit the operator (i) to select a tool from the hardware evaluation module to determine that the node has the necessary hardware elements to operate the updated software, (ii) to select a tool from the software upgrade module to download software into an inactive memory portion of a component of the node while the software element is still operating; (iii) to select a tool from the performance evaluation module to perform download integrity tests; (iv) to select a tool from the upgrade module to switch the status of the inactive memory portion to active if the download integrity tests are passed; and (v) to select a tool from the performance evaluation module to gather statistics of events occurring in step (iv), and said graphic-based scripting module being operable to execute the tools selected in steps (i) to (v) in sequence to perform said upgrading of said node with said new software when said tool from the hardware evaluation module determines that the node has the necessary hardware elements to operate the updated software.

2. The system as claimed in claim 1, further comprising a script display module executable by said computer for generating a graphical representation of said script illustrating said selection of tools, relationships relating to said triggering events of said tools within said selection of tools and a flow of execution of said selection of tools.

3. The system as claimed in claim 2, wherein said node is a communication switch in a communication network.

4. The system as claimed in claim 3, further comprising a script execution module executable by said computer terminal providing a graphical representation of a script session comprising said script and another script operating on said electronic device and a status of operation of said script and said another script.

5. The system as claimed in claim 4, wherein said script execution module provides selectable activation and termination of said script and said another script via said graphical user interface.

6. The system as claimed in claim 5, wherein said each tool of said plurality of tools is associated with a first file providing a set of programmable parameters of operation and a second file providing limits on said set of programmable parameters of operation and said script execution module utilizes said first file and said second file to list scripting options to said user.

7. The system as claimed in claim 1, wherein each tool of said plurality of tools operates in an open operating system environment on said computer terminal.

8. The system as claimed in claim 1, wherein said input element is at least one icon.

9. The system as claimed in claim 8, wherein said at least one icon is a select/link icon for each of said selection of tools.

10. The system as claimed in claim 1, wherein said plurality of configurable software tools includes:

a network discovery tool for creating an internal representation of desired nodes in said network and for use prior to installing new software on said node;

a node configuration tool for obtaining configuration information of modules within said node and for use prior to installing said new software;

a compliance tool for determining whether hardware of said node is compliant with said new software and for use prior to installing said new software; a connection status tool for obtaining status of connections of said node within said network and for use both prior to and after installing said new software;

a system status tool for obtaining status of said modules and for use both prior to and after installing said new software;

a traffic statistics tool for obtaining live traffic patterns and for use both prior to and after installing said new software;

a download tool for installing said new software in one or more of said modules;

a switch banks tool for designating said new software as next in a loadbank in said node;

a switch control tool for bringing said new software for a control complex module of said node into service;

a switch fabric tool for bringing said new software for a switching fabric module of said node into service;

a redundant pairs tool for bringing new software or line card redundant pair modules of said node into service; and, a reporting tool for comparing status and statistics results from said traffic statistics tool before and after installation of said new software to determine whether said installation was successful.

11. A method of upgrading a node of a communications network with updated software, comprising:

providing a computer terminal in communication with said node, said computer terminal including a display screen, a file storage system, and a software system, said software system comprising a plurality of linked modules to provide an upgrade framework for targeted software elements of the node, said linked modules comprising a hardware evaluation module, a performance evaluation module, a software upgrade module, and a network monitoring module, each said module including a set of configurable software tools stored as files in said file storage system and providing executable routines for performing functions associated with their respective module;

providing a graphic-based scripting module on a said computer terminal to present an operator with a screen image to permit the operator to build a script from a selection of tools selected from said sets of software tools and to initiate activation of tools within said selection of tools from selectable triggering events;

said graphic-based scripting module presenting a respective graphical representation of each of said selection of tools on a screen image, and having input elements for receiving instructions from a user for sequencing ones of said selection of tools for said script; and wherein the operator at least (i) selects a tool from the hardware evaluation module to determine that the node has the necessary hardware elements to operate the updated software, (ii) selects a tool from the software upgrade module to download software into an inactive memory portion of a component of the node; (iv) to select a tool from the performance evaluation module to perform download integrity tests; (v) selects a tool from the upgrade module to switch the status of the inactive memory portion to active if the download integrity tests are passed; and (v) selects a tool from the performance evaluation module to gather statistics of events occurring in step (iv); and executing through said graphic-based scripting module the tools selected in steps (i) to (v) in sequence to perform said upgrading of said node with said new software when said tool from the hardware evaluation module determines that the node has the necessary hardware elements to operate the updated software.

12. The method as claimed in claim 11, further comprising utilizing said graphic-based scripting module to generate a graphical representation of said script illustrating said selection of tools, relationships relating to said triggering events of said tools within said selection of tools and a flow of execution of said selection of tools.

13. The method as claimed in claim 11, wherein each tool of said plurality of tools accesses a first file providing a set of programmable parameters of operation and a second file providing limits on said set of programmable parameters of operation and said script execution module utilizes said first file and said second file to list scripting options for said user.

14. The method as claimed in claim 11, wherein the node is a communication switch in a communication network.

15. The method as claimed in claim 11, wherein said input element is at least one icon.

16. The method as claimed in claim 15, wherein said at least one icon is a select/link icon for each of said selection of tools.

17. The method as claimed in claim 11, wherein the performance of said new software is evaluated by comparing data traffic characteristics of the node before and after said operation of said software is activated.

* * * * *